(12) United States Patent
Chiang

(10) Patent No.: US 7,849,757 B2
(45) Date of Patent: Dec. 14, 2010

(54) LINEAR FEEDBACK DEVICE FOR AN ACTUATOR

(75) Inventor: Hsin-An Chiang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 970 days.

(21) Appl. No.: 11/676,292

(22) Filed: Feb. 18, 2007

(65) Prior Publication Data

US 2008/0196521 A1    Aug. 21, 2008

(51) Int. Cl.
*F16H 1/04* (2006.01)
*G01B 7/14* (2006.01)
(52) U.S. Cl. .................... 74/422; 324/207.24
(58) Field of Classification Search ............ 74/89.11, 74/89.12, 89.17, 89.18, 89.23, 422; 324/207.23, 324/207.24, 207.25, 207.26
See application file for complete search history.

(56) References Cited

U.S. PATENT DOCUMENTS 6,246,232 B1 *  6/2001  Okumura ................ 324/207.2

* cited by examiner

*Primary Examiner*—Thomas R Hannon
*Assistant Examiner*—Phillip A Johnson
(74) *Attorney, Agent, or Firm*—Banger Shia

(57) ABSTRACT

A linear feedback device for an actuator comprises: a coiling belt, a return gear wheel, a driven member, and a sensing feedback device. The sensing linear feedback device serves to feedback the displacement data of the driven member that is moveable along a predetermined rail after engaging with the return gear wheel. The return gear wheel is coaxial with the coiling belt, and the coiling belt unwinds or retracts along with the actuator and drives the return gear wheel to rotate. The gear ratio between the return gear wheel and the driven teeth is used to adjust the back and forth moving distance of the probe. The linear feedback device can be installed in a small external hanging type body and offer an absolute position sensing function while preventing the error accumulation.

7 Claims, 5 Drawing Sheets

LINEAR FEEDBACK DEVICE FOR AN ACTUATOR

BACKGROUND OF THE INVENTION

1. Field of the Invention

The present invention relates to a data position data feedback device, and more particularly to a linear feedback device for an actuator that utilizes the gear ratio between the return gear wheel and the driven teeth to adjust the back and forth moving distance of the probe. The present invention can be used as an external hanging type equipment and offer an absolute position sensing function while preventing the error accumulation.

2. Description of the Prior Art

Nowadays, linear actuators are applied more and more widely in industrial field, and particularly in the high precision mechanism. The linear actuators must be provided with precision position data linear feedback device in order to accurately control the high precision mechanism. Hence, it is self-evident that the actuator is very important to the existing various industrial mechanisms.

Most of the current linear actuators suitable for use in high precision equipments are usually provided with three types of position data feedback devices, they are: linear potential feedback device, magnetic induction feedback device, and rotary feedback device, and their respective techniques are described as follows:

Linear potential linear feedback device is a technique of calculating the position by converting linear position change into adjustable resistance value. When the linear potential linear feedback device moves along with linear actuator, it will move the spring leaf for contacting the internal adjustable resistor, consequently changing the resistance value and the outputted voltage signal, thus achieving the function of calculating the displacement of the linear potential feedback device. As shown in FIG. 1, a conventional linear potential linear feedback device comprises a rod-shaped body 10, a driven rod 11 and a transmission belt 12. The body 10 is positioned on the actuator 13 and located along the moving direction thereof, the driven rod 11 is disposed on the body 10 is connected to the end of the moving assembly 131 of the actuator 13 via the transmission belt 12. When the moving assembly 131 of the actuator 13 moves, the transmission belt 12 will drive the driven rod 11 to move relative to the body 10, thus changing the resistance value of the body 10 and the position of the spring leaf. This conventional technique still has the following disadvantages:

First, since the length of the driven rod 11 and the body 10 must be in accordance with the travel length of the moving assembly 131 of the actuator 13, the body 10 of the linear potential linear feedback device is relatively long and is space consuming.

Second, since the length of the driven rod 11 and the body 10 must be in accordance with the travel length of the moving assembly 131 of the actuator 13, a to and fro movement of the moving assembly 131 will cause a relatively large amount of wear to the resistor and the spring leaf.

Third, since the travel length of the moving assembly 131 of the actuator 13 determines the entire length of the conventional linear actuator, the size of the linear potential linear feedback device for each actuator 13 has been fixed, the linear potential feedback devices of different sized linear actuators 13 are not interchangeable. Therefore, the linear potential linear feedback device is unsuitable for mass production and cannot be used as an external hanging type accessory to different sized linear actuators 13.

To solve the abovementioned disadvantages, magnetic induction linear feedback device and rotary linear feedback device appeared on the current market, their respective techniques and problems are explained as follows:

The magnetic induction linear feedback device has a rotary disc disposed on the rotary end of the motor inside the linear actuator, around the outer periphery of the rotary disc is annularly arranged a plurality of magnetic members, another sensor rotating along with the motor serves to detect the polarity of the respective magnetic member passed by. This conventional technique has the advantage of non-contact and can improve the problem of the size being restricted by the travel length. However, the problem is that the feedback signal can only feedback the relative position, so that he software is complicated and difficult to control. Further, the annularly arranged magnetic members still produces induction sectors, it not only has the problem that the displacement within the same sector cannot be calculated accurately, but the errors of the respective magnetic members will be accumulated along with the accumulation of rotation.

The rotary linear feedback device has a contact-type rotary potentiometer mounted on the rotary end of the motor and doesn't have the problem of the error accumulation, induction sector, and the travel length restriction, but it has the problem of abrasion. Further, the rotary linear feedback device must be connected to the motor, therefore, not only the interior connection and the spatial position should be considered comprehensively when designing the interior, but also the rotary potentiometer must be assembled in the actuator during the assembly process and is difficult to disassemble. Therefore, the user can't choose to assemble or not to assemble, further, it impossible to produce hanging type accessory product for this type of rotary feedback device.

The present invention has arisen to mitigate and/or obviate the afore-described disadvantages.

SUMMARY OF THE INVENTION

The primary objective of the present invention is to provide a hanging type linear feedback device for an actuator.

The secondary objective of the present invention is to provide a linear feedback device for an actuator whose size is not restricted by the travel length.

To achieve the abovementioned objectives, the linear feedback device for an actuator in accordance with the present invention is detachably disposed on the outer surface of a linear actuator, and comprises: a coiling belt, a return gear wheel, a driven member, and a sensing feedback device.

The sensing linear feedback device serves to feedback the displacement data of the driven member that is moveable along a predetermined rail after engaging with the return gear wheel. The return gear wheel is coaxial with the coiling belt, and the coiling belt unwinds or retracts along with the actuator and drives the return gear wheel to rotate.

The gear ratio between the return gear wheel and the driven teeth is used to adjust the back and forth moving distance of the probe, so that the contact type adjustable resistor doesn't need to cooperate with the travel length, and the size of the present invention can be reduced.

The return gear wheel and the coiling belt moves along with the actuator, and are driven to their original positions by an elastic return force. The elastic return force can be produce by a return spring mounted on the return gear wheel or the pivot.

Since the present invention is detachably attached to the outer surface of the linear actuator, and the operation of the coiling belt is uncorrelated with the interior structure of the linear actuator, the present invention can be used as an external hanging type equipment to be attached to the outer surface of different sized or shaped actuator.

In addition, the respective subassemblies of the present invention can be mounted on the outer surface of the actuator in a hanging manner by cooperating with a hollow body, and can also be mounted on a detachable part of the actuator.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
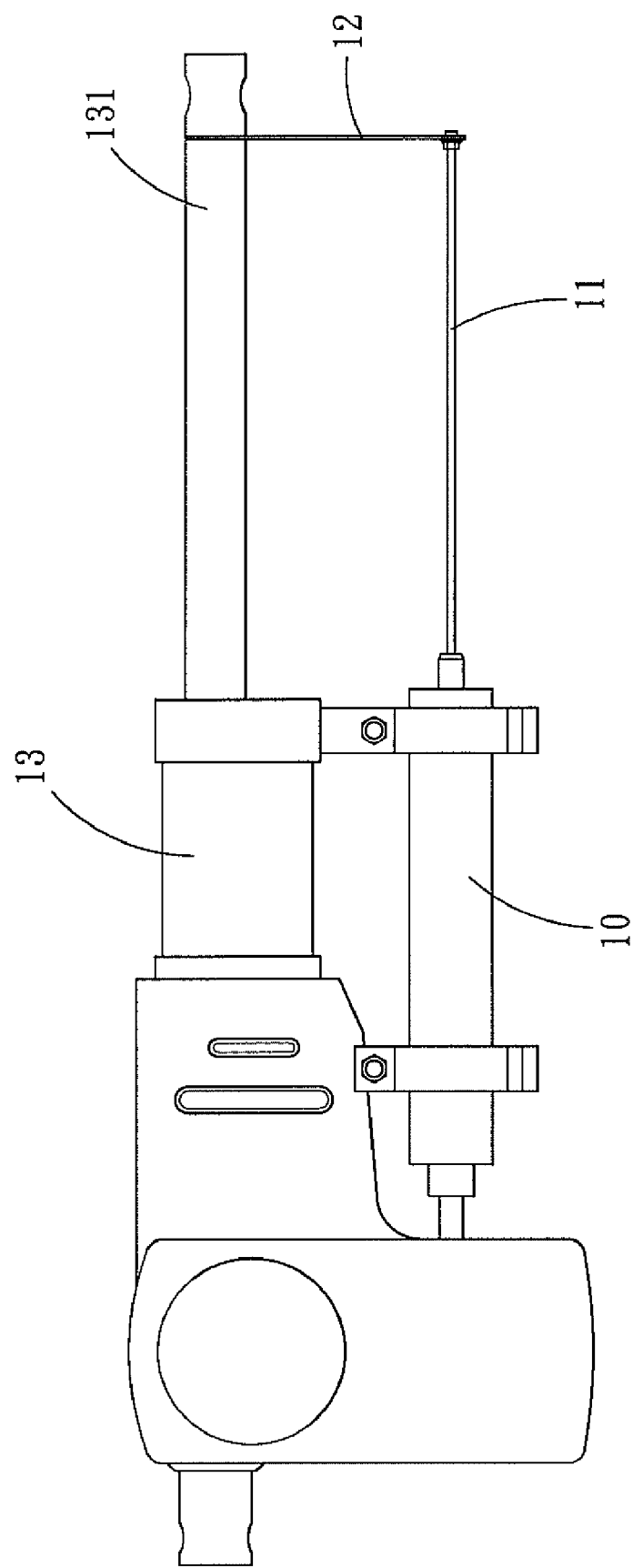
FIG. 1 is a perspective view of a conventional linear feedback device for an actuator.
Figure 2:
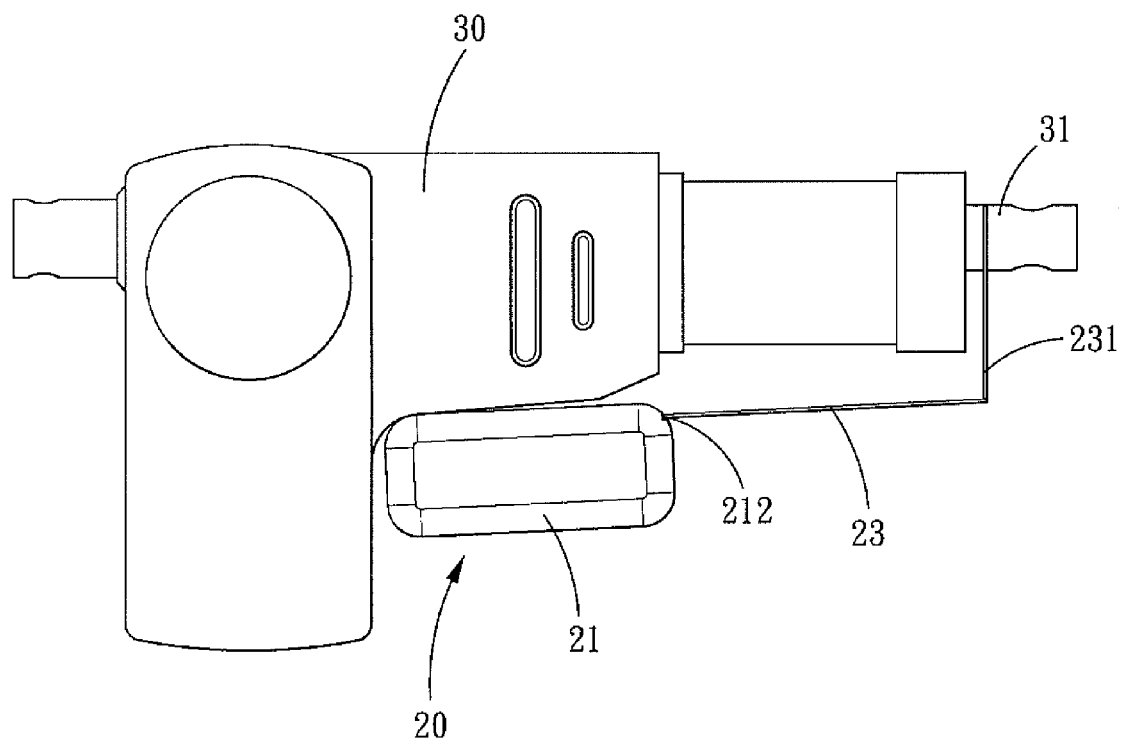
FIG. 2 is an assembly view of a linear feedback device for an actuator in accordance with the present invention.
Figure 3:
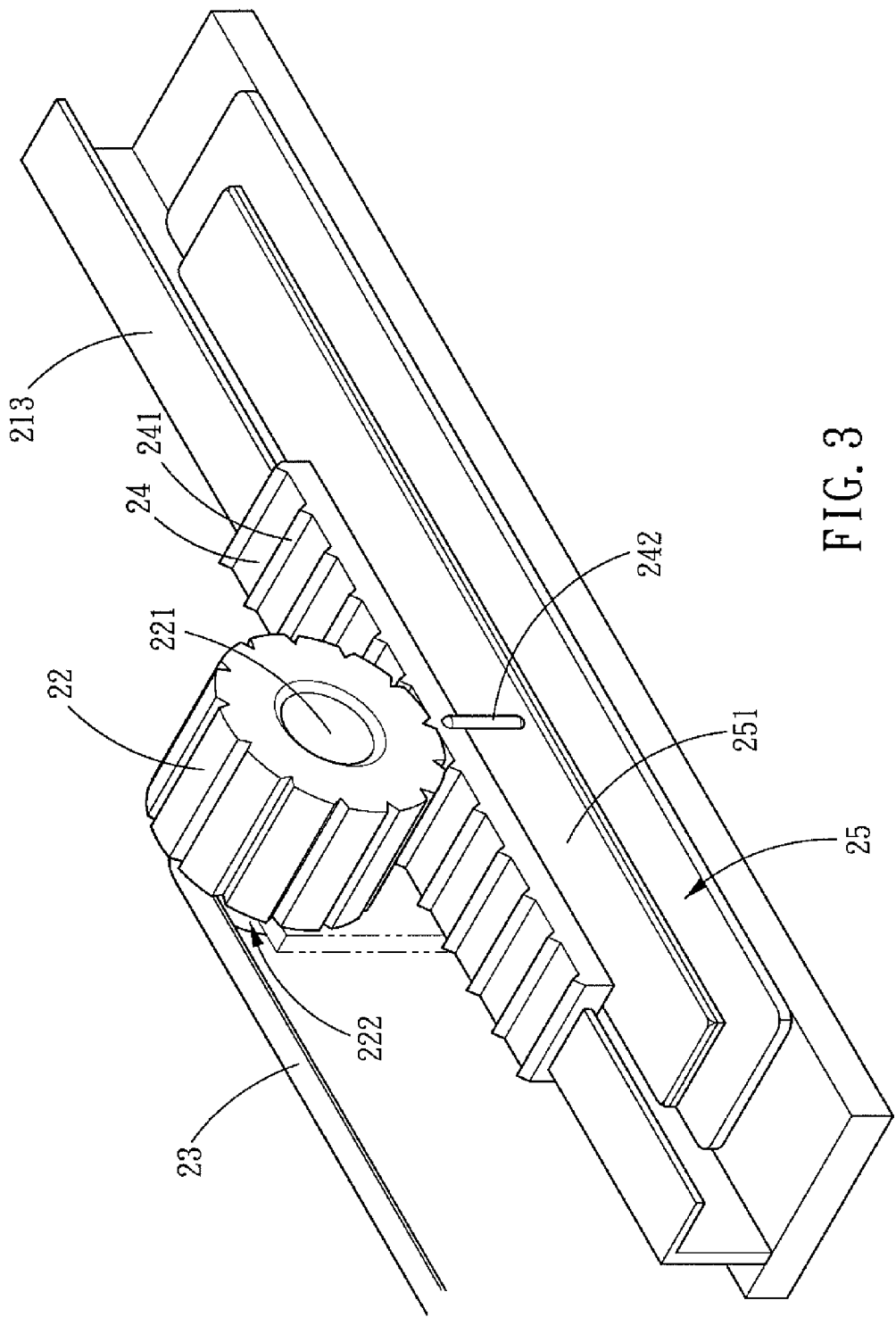
FIG. 3 is a perspective view of showing the interior of the linear feedback device for an actuator in accordance with the present invention.
Figure 4:
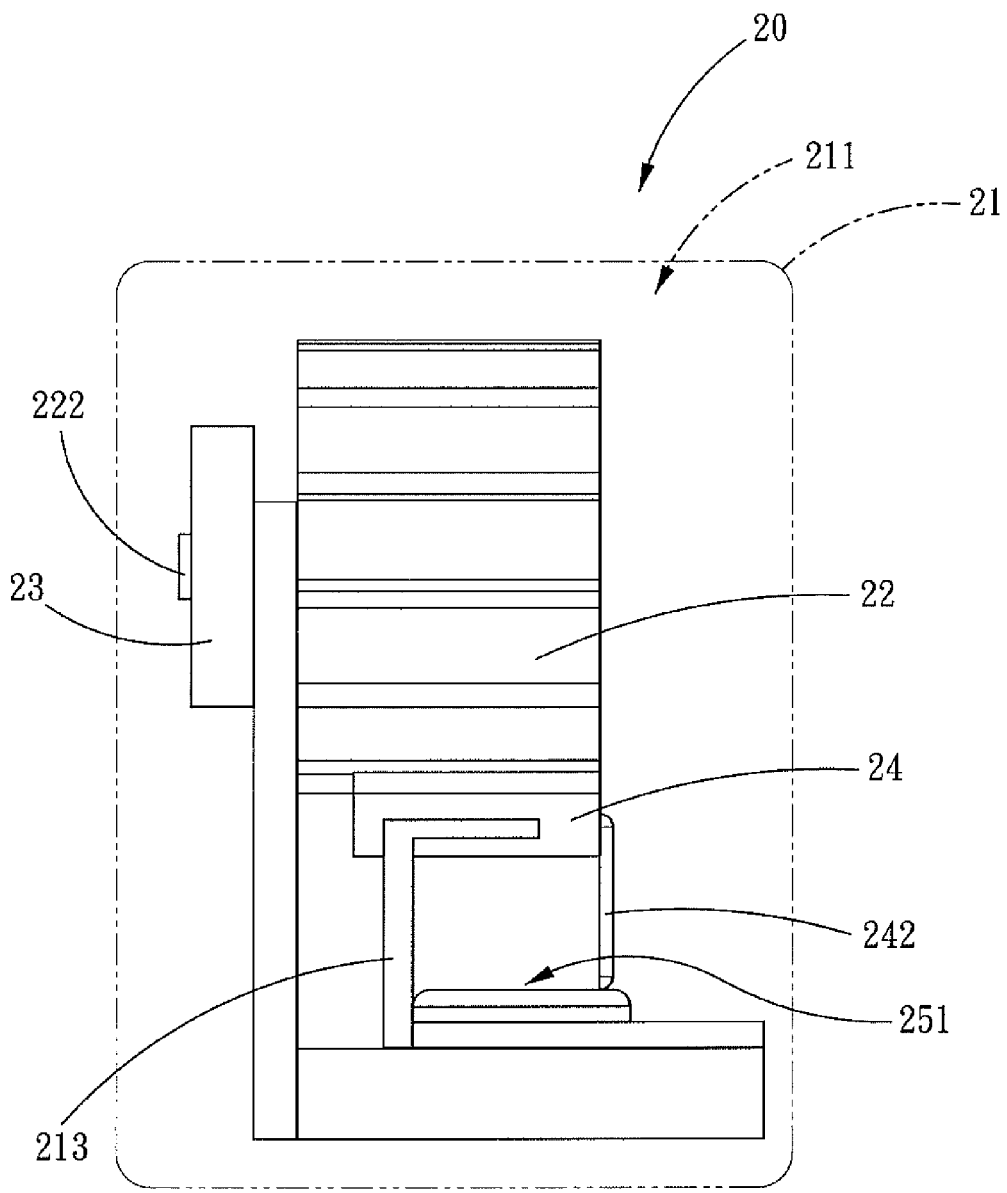
FIG. 4 is a side view of showing the interior of the linear feedback device for an actuator in accordance with the present invention.

Referring to FIGS. 2, 3 and 4, a linear feedback device 20 for an actuator in accordance with the present invention is mounted a actuator 30 and comprises: a body 21, a return gear wheel 22, a coiling belt 23, a driven member 24, and a sensing linear feedback device 25.

The body 21 is a hanging type hollow housing attached to the outer surface of the actuator 30 and is defined with a receiving space 211 and at least one opening 212. In the receiving space 211 is disposed a linear rail 213.

The return gear wheel 22 is disposed in the receiving space 211 of the body by a pivot 221 and is located correspondingly to the rail 213. A belt-mounting seat 222 is disposed at one side of the pivot 221, and the return gear wheel 22 moves synchronously with the belt-mounting seat 222.

The coiling belt 23 is a flat coil spring with automatic retracting function, one end of the coiling belt 23 is positioned on the belt-mounting seat 222 of the return gear wheel 22, the coiling belt 23 winds around the belt-mounting seat 222, and the other end of the coiling belt 23 passes through the opening 212 of the body 21 and is positioned on the end of the moving member 31 of the actuator 30 by a connecting member 231. The return elastic force of the coiling belt 23 enables the return gear wheel 22 to rotate to its original position.

The driven member 24 is a board-shaped member disposed in the receiving space 211 of the body 21 and slidably mounted on the rail 213 of the body 21. On the surface of the driven member 24 is formed a plurality of teeth 241 for meshing with the return gear wheel 22. A probe 242 is disposed on one side of the driven member 24 and is driven to move back and forth by the return gear wheel 22.

The sensing linear feedback device 25 is disposed in the receiving space 211 of the body 21 and is located beside the rail 213 of the body 21. The sensing linear feedback device 25 includes a sensing surface 251 for contacting the probe 242 of the driven member 24 and for adjusting the resistance value along with the displacement of the probe 242 of the driven member 24, the changed resistance value changes the outputted voltage signal, thus achieving the purpose of calculating the displacement.

For a better understanding of the present invention, its operation and function, reference should be made to the respective drawings again.

Since the coiling belt 23 is a flat coil spring with automatic retracting function, one end of the coiling belt 23 is positioned on the belt-mounting seat 222 of the return gear wheel 22, the coiling belt 23 winds around the belt-mounting seat 222, and the other end of the coiling belt 23 passes through the opening 212 of the body 21 and is positioned on the end of the moving member 31 of the actuator 30 by a connecting member 231. Therefore, the coiling belt 23 of the present invention can unwind or retract along with the linear displacement of the moving member 31 of the actuator 30.

At this moment, the winding or retracting motion of the coiling belt 23 along with the displacement of the moving member 31 drives the return gear wheel 22 to rotate to and fro, meanwhile, the driven member 24 is driven to move back and forth by the return gear wheel 22, and the probe 242 moves synchronously with the driven member 24, as a result, the sensing surface 251 of the sensing linear feedback device 25 is contacted by the probe 242 of the driven member 24 to adjust the resistance value.

The present invention utilizes the displacement of the driven member 24 to change the voltage value and the outputted voltage signal, thus achieving the purpose of accurately calculating the displacement.

Figure 5:
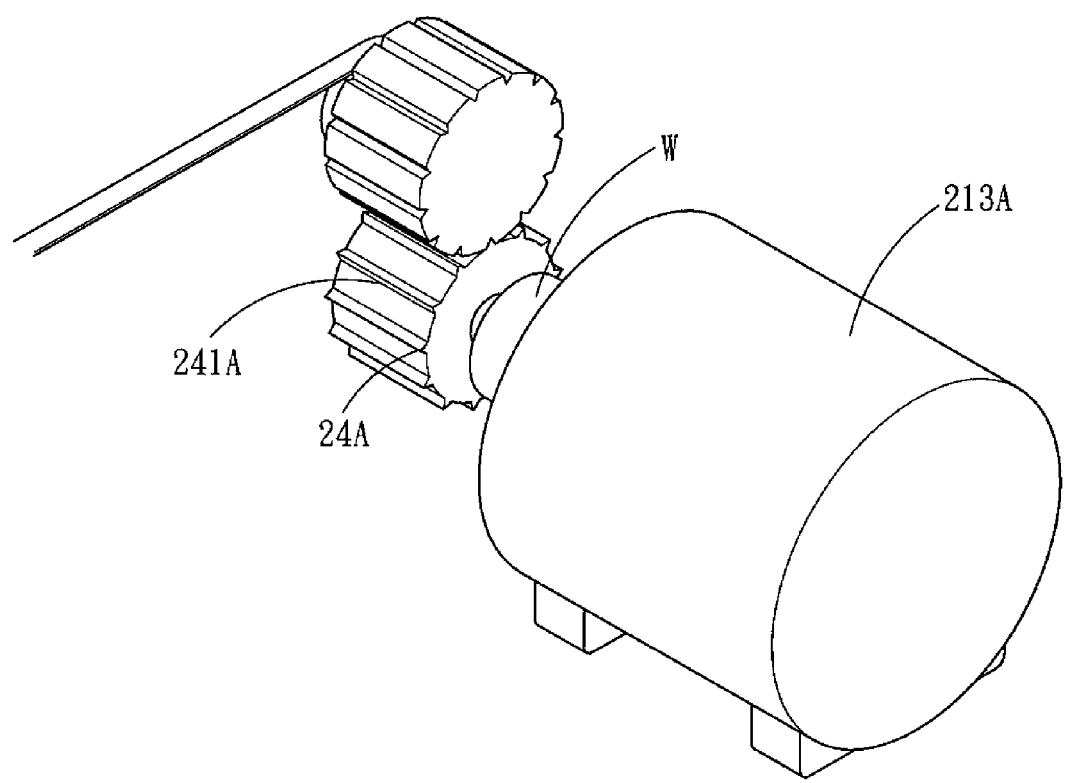
FIG. 5 is a perspective view of showing a linear feedback device for an actuator in accordance with another embodiment of the present invention.

Referring to FIG. 5, which shows another embodiment of the present invention, wherein the driven member can be revised to be a gear wheel type driven member 24A that is still disposed in the receiving space 211 of the body 21 and is confined in a circular rail 213A by a pivot W. On the surface of the driven member 24A is formed a plurality of teeth 241A for meshing with the return gear wheel 22, and on the pivot W of the driven member 24A is disposed a probe (not shown). The driven member 24 is driven to rotate back and forth by the return gear wheel 22.

The sensing linear feedback device (not shown) is mounted in the circular rail 213A of the body 21 and has an annular surface for contacting the probe of the driven member and for adjusting the resistance value along with the movement of the probe, thus achieving the purpose of displacement calculation. This embodiment is the same as the previous embodiment in terms of technique and function, it therefore should be considered within the scope of the present invention.

It is to be noted that the present invention has the following advantages:

First, since the driven member is slidably confined on the rail of the body, and on the surface of the driven member is formed a plurality of teeth for meshing with the return gear wheel, the present invention can utilize the gear ratio between the return gear wheel and the driven teeth to adjust the back and forth moving distance of the probe, without being restricted by the extending length the coiling belt extending out or the number of circles that the coiling belt retracts along with the displacement of the moving member (the feeding travel length and the size of the actuator are unrestricted).

Second, the respective components of the present invention can be disposed in a small body, therefore, the application scope of the present invention is relatively large and meets the requirement of hanging type and modularization.

Third, since the present invention is driven by the coiling belt, another end of the coiling belt is positioned at the end of the moving member of the actuator by a connecting member, the present invention can be fastened to the actuator in a hanging manner without being fixed inside the linear actuator. It is not only easy to assemble and disassemble, but offers the user the choice to assemble or disassemble.

To summarize, the linear feedback device for an actuator in accordance with the present invention comprises: a coiling belt, a return gear wheel, a driven member, and a sensing feedback device. The sensing linear feedback device serves to feedback the displacement data of the driven member that is moveable along a predetermined rail after engaging with the return gear wheel. The return gear wheel is coaxial with the coiling belt, and the coiling belt unwinds or retracts along with the actuator and drives the return gear wheel to rotate. The gear ratio between the return gear wheel and the driven teeth is used to adjust the back and forth moving distance of the probe. The present invention can be used as a hanging type accessory and offer an absolute position sensing function while preventing the error accumulation.

While we have shown and described various embodiments in accordance with the present invention, it is clear to those skilled in the art that further embodiments may be made without departing from the scope of the present invention.

What is claimed is:

1. A linear feedback device for an actuator comprising: a body, a return gear wheel, a coiling belt, a driven member, and a sensing feedback device; wherein: the body is defined with a receiving space, wherein a rail is disposed therein; the return gear wheel is positioned on a pivot and disposed in the receiving space, the coiling belt winds around the return gear wheel, the return gear wheel is located adjacent to the rail, one end of the coiling belt is connected to a rotary end of the linear actuator, the return gear wheel moves synchronously with the coiling belt, wherein the return gear wheel and the coiling belt are driven to their original positions by a return elastic force; the driven member is slidably confined on the rail of the body, on a surface of the driven member is formed a plurality of teeth for meshing with the return gear wheel, a probe is disposed on one side of the driven member, the driven member is driven to move back and forth by the return gear wheel; and the sensing linear feedback device is disposed in the receiving space of the body and is located on the rail, the sensing linear feedback device has a sensing surface for contacting the probe of the driven member and for adjusting an output value of the sensing linear feedback device along with displacement of the probe.

2. The linear feedback device for an actuator as claimed in claim 1, wherein a belt-mounting seat is mounted on the pivot of the return gear wheel and moves synchronously with the return gear wheel, the coiling belt is a flat coil spring with automatic retracting function, one end of the coiling belt is positioned on the belt-mounting seat of the return gear wheel, the coiling belt winds around the belt-mounting seat, and the other end of the coiling belt is positioned on the rotary end of the linear actuator, the coiling belt enables the return gear wheel to rotate to its original position.

3. The linear feedback device for an actuator as claimed in claim 1, wherein the body is a hanging hollow housing attached to an outer surface of the actuator and is defined with the receiving space and at least one opening, and the other end of the coiling belt extends out of the opening of the body.

4. The linear feedback device for an actuator as claimed in claim 1, wherein the body is a detachable part of the actuator and is defined with the receiving space and at least one opening, and the other end of the coiling belt extends out of the at least one opening of the body.

5. The linear feedback device for an actuator as claimed in claim 1, wherein the actuator is a linear actuator, the rail of the body is linear, the driven member is a board-shaped member to be driven to move back and forth linearly by the return gear wheel along with the displacement of the linear actuator.

6. The linear feedback device for an actuator as claimed in claim 1, wherein the rail is a circular rail, the driven member is a gear being confined in the circular rail, the probe is positioned on the pivot of the driven member, the driven member is rotated to and fro by the return gear wheel, and the sensing feedback device is disposed in the circular rail and has an annular surface for contacting the probe of the driven member.

7. The linear feedback device for an actuator as claimed in claim 1, wherein the elastic force is provided by the coiling belt mounted on the return gear wheel or the pivot.

* * * * *